(12) United States Patent
Ho (10) Patent No.: US 11,131,364 B2
(45) Date of Patent: Sep. 28, 2021

(54) GEARING ASSEMBLY FOR AN ADJUSTING UNIT

(71) Applicant: ADIENT ENGINEERING AND IP GMBH, Burscheid (DE)

(72) Inventor: Van-Toan Ho, Solingen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 16/648,554

(22) PCT Filed: Sep. 25, 2018

(86) PCT No.: PCT/EP2018/075870
§ 371 (c)(1),
(2) Date: Mar. 18, 2020

(87) PCT Pub. No.: WO2019/063510
PCT Pub. Date: Apr. 4, 2019

(65) Prior Publication Data
US 2020/0217397 A1 Jul. 9, 2020

(30) Foreign Application Priority Data
Sep. 26, 2017 (DE) ............. 10 2017 217 050.6

(51) Int. Cl.
*F16H 1/28* (2006.01)
(52) U.S. Cl.
CPC ....... *F16H 1/28* (2013.01); *F16H 2001/2881* (2013.01)

(58) Field of Classification Search
CPC ........................................................ F16H 1/28
See application file for complete search history.

(56) References Cited

U.S. PATENT DOCUMENTS

| 3,108,498 A | * | 10/1963 | Hedin | .................. B25J 9/0018 475/5 |
| 9,421,891 B2 | * | 8/2016 | Andres | ................. F16H 37/041 |
| 2018/0172112 A1 | | 6/2018 | Hansson et al. | |
| 2020/0278009 A1 | * | 9/2020 | Hudson | ................. B60N 2/2251 |

FOREIGN PATENT DOCUMENTS

| DE | 69008901 T2 | 11/1994 | |
| EP | 0388207 A2 * | 9/1990 | ............... F16H 1/28 |
| EP | 0388207 B1 | 5/1994 | |
| EP | 3101313 A1 | 7/2016 | |

OTHER PUBLICATIONS

European Patent Office, International Search Report with Written Opinion, issued in PCT/EP2018/075870, dated Oct. 30, 2018, 13 pages, European Patent Office, Rijswijk, Netherlands.

* cited by examiner

*Primary Examiner* — Derek D Knight
(74) *Attorney, Agent, or Firm* — Marshall & Melhorn, LLC (57) ABSTRACT

A gearing assembly for torque transmission may have an epicyclic gearing unit having two ring gears, each having a toothing with a different number of teeth. At least three planetary gears may roll in the two ring gears. One of the ring gears may be stationary and the other ring gear is designed to move. Two of the planetary gears may be bearing gears and a third planetary gear rolls in both ring gears as a force-transmitting gear.

9 Claims, 13 Drawing Sheets

GEARING ASSEMBLY FOR AN ADJUSTING UNIT

The invention relates to a gearing assembly for an adjusting unit of a seat, especially a height adjusting unit of a head rest or a back adjusting unit of a seat back of a seat.

Gearing assemblies for an adjusting unit are known in the prior art, being designed as a wobble mechanism or planetary gearing. These wear against in particular the eccentric cam or sun wheel, so that a rolling of the planetary gears is not always assured.

The object of the present invention is to indicate an improved gearing assembly is for an adjusting unit, making possible a high transmission ratio with little wear. Furthermore, the object of the invention is to indicate a gear motor with an improved gearing assembly.

The problem is solved according to the invention with a gearing assembly having the features of patent the claims. Regarding the gear motor, the invention is achieved by the features of patent the claims.

Modifications of the invention are the subject matter of the dependent claims.

The gearing assembly comprises a drive unit, especially a worm drive unit, and an epicyclic gearing unit coupled thereto, wherein the epicyclic gearing unit has two ring gears, with a different number of teeth, and at least three planetary gears roll in the two ring gears, wherein one of the ring gears is stationary and the other ring gear is designed to be movable, especially rotatable, as the output element, and the three planetary gears are each coupled to a drive wheel of the drive unit, especially a worm wheel of the worm drive unit.

An alternative gearing assembly for torque transmission comprises an epicyclic gearing unit having two ring gears, each having a toothing with a different number of teeth, wherein at least three planetary gears roll in the two ring gears, wherein one of the ring gears is stationary and the other ring gear is designed to be movable and wherein two of the planetary gears are bearing gears and a third planetary gear is a force-transmitting gear and all the planetary gears roll in the two ring gears.

In order to accomplish a high transmission ratio, the toothings of the two ring gears have a difference of one tooth.

The respective epicyclic gearing unit of the different gearing assemblies is designed as a self-locking planetary gearing unit having planetary gears with no sun wheel or eccentric cam, the planetary gears being rotationally fixed to is the drive wheel. For example, the planetary gears are each rotationally fixed by means of a bolt connection.

The benefits accomplished with the invention consist in particular in that, owing to the cam-free configuration of the respective planetary gearing unit, the efficiency of the gearing assembly is heightened and the wear is decreased. In particular, because of the fact that the usual eccentric cam is omitted, the wear on the gearing assembly is definitely reduced as compared to customary wobble mechanisms or planetary gearings with an eccentric cam. Furthermore, the gearing assembly enables a high transmission ratio on account of the tooth difference (also known as the difference in the number of teeth), for example, of one of the ring gears.

In one possible embodiment, the two bearing gears have toothings with the same number of teeth. The toothings of the planetary gears serving as bearing gears are thus identical. The two bearing gears serve as spacers and limit the freedom of movement during the rolling in the ring gears. The bearing gears with the force-transmitting planetary gear roll in the ring gears and produce a position oriented toward the center in order to remain at the center of the epicyclic gearing unit with respect to the shaft axis of an output shaft.

In another embodiment, the bearing gears are rotatably divided and comprise one partial bearing gear for each ring gear. The two partial bearing gears of each bearing gear are separate from each other and roll independently of each other in the respective ring gear. The partial bearing gears of a bearing gear have toothings with an equal number of teeth. Furthermore, the toothings of the bearing gears correspond to the toothings of the ring gears.

A drive wheel is provided at the drive side on one of the two ring gears, having three bolts at the end face in the direction of the ring gears to receive one each of the planetary gears. A holding element, in turn carrying the bolts and securing the planetary gears on the drive wheel, is arranged at the free end of the bolts carrying the planetary gears.

In another embodiment, a bracket is arranged at the output side, carrying an output shaft which is rotatably mounted. For example, the output shaft is rotatably mounted on the drive wheel. A pinion is arranged on the bracket at the side of the output shaft opposite the drive, and thus on the output side. The bracket can be held by webs in the ring gear at the output side. By means of the pinion, an adjusting unit is drivable at the output side, such as a height adjusting unit of a head rest or a back adjusting unit of a seat back, in order to accomplish an adjustment.

The object is furthermore achieved by a gear motor with the above described gearing assembly, making possible a motorized adjustment. For this, a motor, especially an electric motor, drives the output shaft across the gearing assembly, such as the epicyclic gearing unit or another gear transmission in planetary design. The toothings of the planetary gears mesh with the ring gears having different toothings, thereby forming at least one gear stage with different reduction ratios.

In one possible embodiment, a motor is arranged perpendicular to the gearing assembly, especially at 90° to the longitudinal axis of the gearing assembly. The drive wheel, especially a worm wheel, with an external worm toothing, comprises a bolt carrier for the bolts of the planetary gears in the hollow interior. For example, the bolt carrier with bolts is introduced into the drive wheel by injection molding.

The perpendicular arrangement of motor and gearing assembly relative to each other enables a small design space. Since there is no eccentric cam, the gear motor has better efficiency. Since there is also no sun wheel, the wear is reduced.

Exemplary embodiments of the invention will be explained more closely with the aid of drawings. There are shown:

FIG. 1 schematically, an exemplary embodiment of a gearing assembly having a drive unit and a gearing unit coupled thereto, FIG. 2 schematically, in perspective representation, the gearing assembly with opened housing, FIG. 3 schematically, in perspective representation, an exemplary embodiment for the design of the gearing unit as an epicyclic gearing without sun wheel and having an output shaft with pinion, FIG. 4 schematically, in perspective representation, the connection of the planetary gears to the drive wheel, FIG. 5 schematically, in exploded representation, the gearing unit with the drive wheel, the ring gears, the planetary gears and the output shaft, FIG. 6 schematically, in top view, on the drive side (without drive wheel), the rolling of the planetary gears against the ring gears, FIG. 7 schematically, in perspective view, the gearing unit without drive wheel and the rolling of the planetary gears against the ring gears and with output shaft and pinion, FIG. 8 schematically, in exploded representation, a design of the gearing assembly with drive wheel and output shaft with pinion, FIG. 9 schematically, in top view, on the output side, the rolling of the planetary gears against the ring gears, FIG. 10 schematically, a sectional diagram through FIG. 9, FIG. 11 schematically, in exploded representation, an embodiment of a gear motor, FIG. 12 schematically, in perspective representation, the gear motor in the assembled state, and FIG. 13 schematically, a gear motor in the assembled state, without cover.

Mutually corresponding parts are given the same reference numbers in all the figures.

Figure 1:
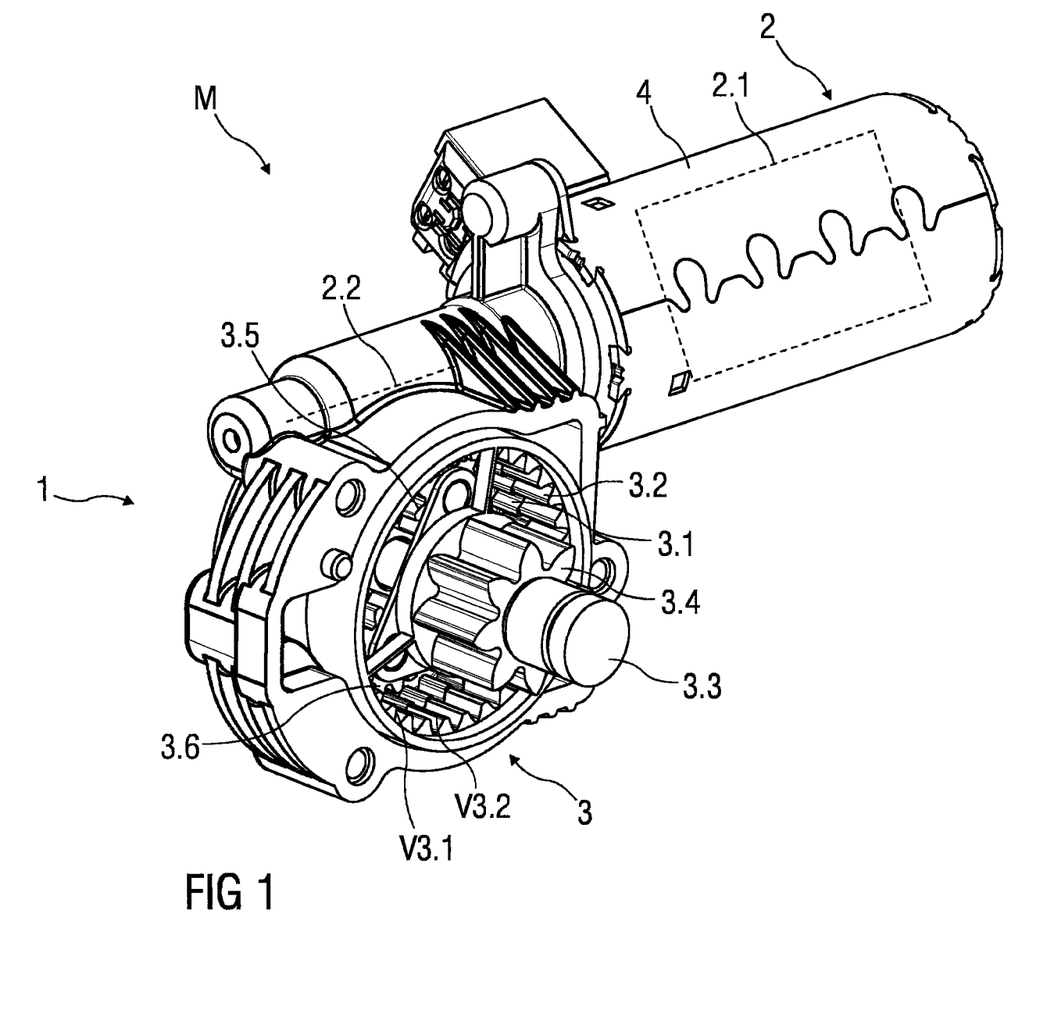

FIG. 1 shows schematically an exemplary embodiment of a gearing assembly 1 having a drive unit 2 and a gearing unit 3 coupled thereto. The gearing assembly 1 together with the drive unit 2 form a gear motor M.

The gearing assembly 1 is, for example, part of a schematically represented adjusting unit V, for example for a seat S. For example, the gearing assembly 1 is part of a height adjusting unit of a head rest or a back adjusting unit of a seat back of the seat S, especially a vehicle seat.

The gearing assembly 1 serves for the torque transmission from the drive unit 2 by means of the gearing unit 3 to the adjusting unit V and it drives a spindle, for example.

The drive unit 2 is configured for example as a worm drive unit and it comprises a motor 2.1 and a drive shaft 2.2 having a worm, not otherwise represented. The motor 2.1 and the drive shaft 2.2 with worm are concealed in FIG. 1 by a housing 4.

The housing 4 has multiple pieces and it also houses the gearing unit 3 in addition to the drive unit 2. The motor 2.1 is arranged perpendicular to the gearing unit 3.

Figure 11:
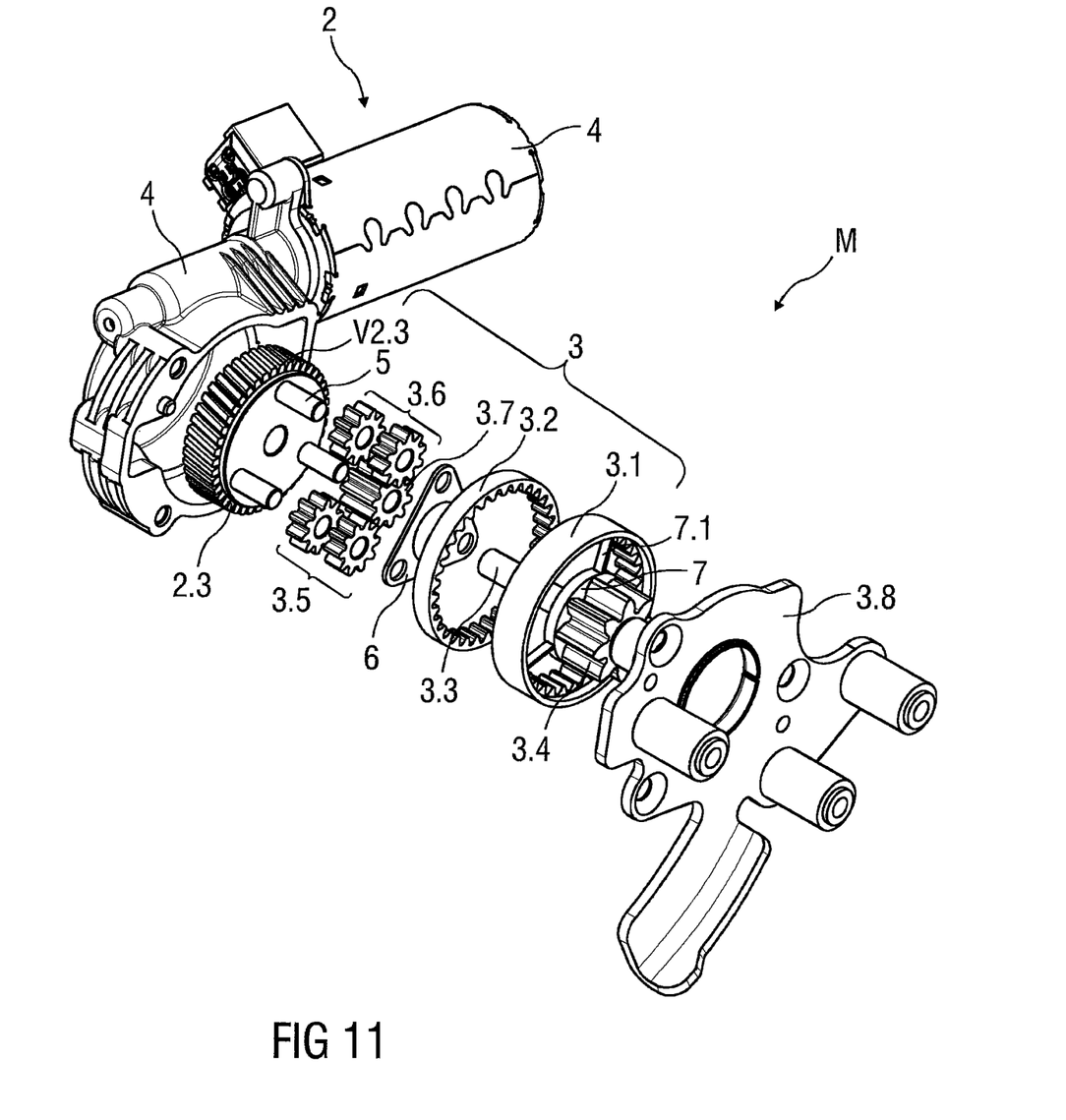
Figure 12:
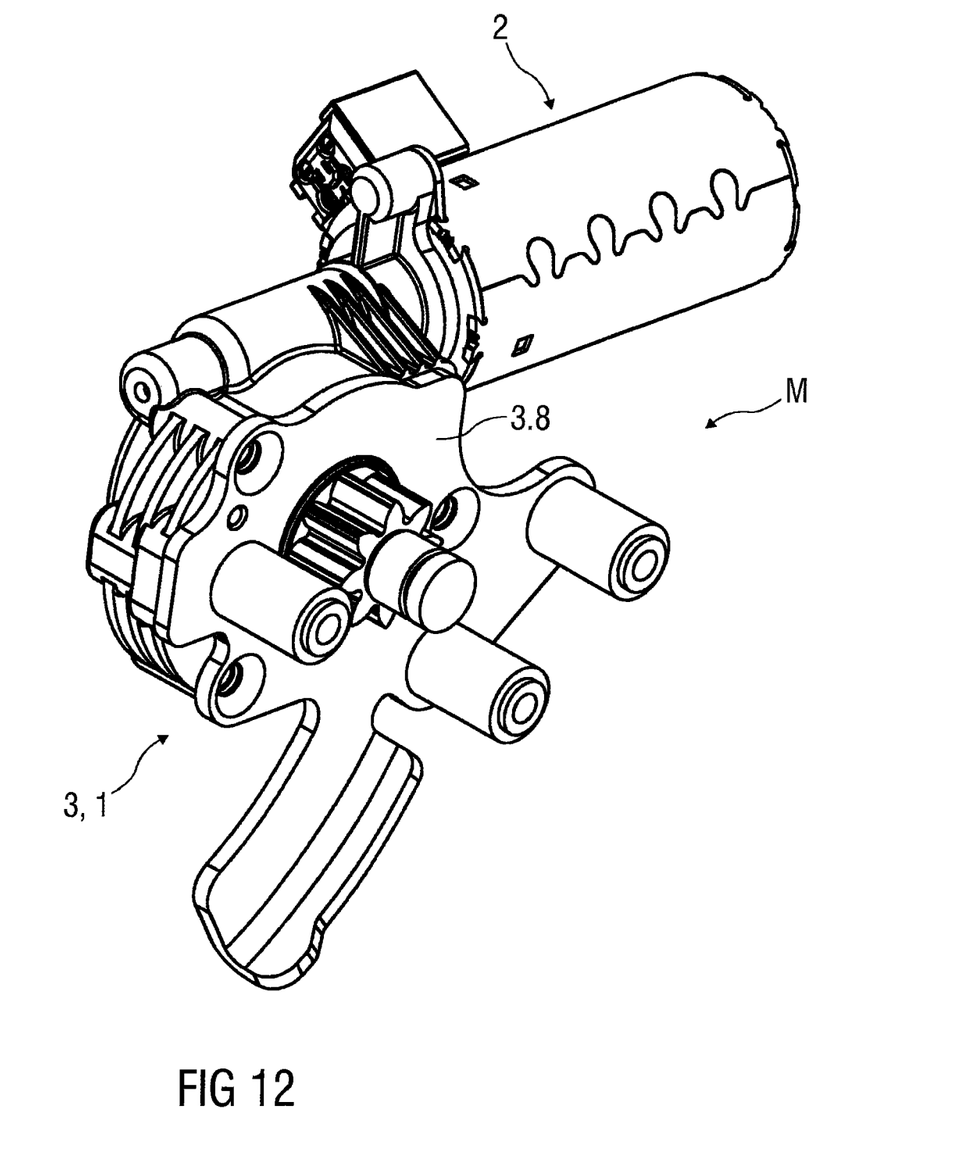

In FIG. 1, the housing 4 is shown open in the area of the gearing unit 3. The housing 4 comprises a cover 3.8 to cover the gearing unit 3, which is shown in FIGS. 11 and 12.

The gearing unit 3 is designed for example as an epicyclic gearing unit and it is coupled to the drive unit 2. The epicyclic gearing unit is denoted hereafter as the epicyclic gearing unit 3.

The epicyclic gearing unit 3 comprises two ring gears 3.1 and 3.2. The number of teeth of the ring gears 3.1 and 3.2 for the torque transmission from the drive unit 2 to the epicyclic gearing unit 3 is different from each other. For example, the difference in teeth between the toothings V3.1 and V3.2 is one or more.

One of the ring gears 3.1 is designed to be stationary. For example, the ring gear 3.1 is joined to the housing 4 and is rotationally fixed. The other ring gear 3.2 as the output element is designed to be movable, especially rotatable. Hence, the ring gear 3.2 transmits a torque to an output shaft 3.3 and to the pinion 3.4 of one of the adjusting units V, mounted hereon. The configuration of the epicyclic gearing unit 3 and the nature of the coupling to the motor 2.1 and the adjusting unit V determine which shaft or which gear will be fixed and which shaft/gear will serve as the drive or output.

At least three planetary gears 3.5 to 3.7 roll in the ring gears 3.1 and 3.2, as will be explained more closely below with the aid of FIGS. 2 and 3.

The planetary gears 3.5 to 3.7 are each coupled to a drive wheel 2.3 of the drive unit 2. In particular, the planetary gears 3.5 to 3.7 are each connected by means of a bolt 5 to the drive wheel 2.3.

The drive wheel 2.3 is coupled to the motor 2.1. The gear motor M, for example, is a worm gear motor. The drive wheel 2.3 in particular is designed as a worm wheel of a worm drive unit.

The drive wheel 2.3 has an external toothing V2.3, in which the not otherwise represented worm of the drive shaft 2.2 of the drive unit 2 engages and drives the drive wheel 2.3.

The ring gears 3.1 and 3.2 have an internal toothing V3.1, V3.2.

Because of the firm connection of the planetary gears 3.5 to 3.7 to the drive wheel 2.3, the planetary gears 3.5 to 3.7 roll in the ring gears 3.1 and 3.2, especially in their internal toothings V3.1, 3.2, as will be described more closely below.

The planetary gears 3.5 to 3.7 have an external toothing V3.5 to V3.7. Two of the planetary gears 3.5 and 3.6 have a two-piece design and serve as a bearing or bearing gears, which roll against the internal toothings V3.1, V3.2 of the ring gears 3.1 and 3.2, in order to remain at the center of the epicyclic gearing unit 3 with respect to the shaft axis of the output shaft 3.3.

The planetary gears 3.5 and 3.6 acting as the bearing are rotatably divided. In particular, the planetary gears 3.5 and 3.6 each have a two-piece design. For example, the planetary gear 3.5 has two corresponding partial bearing gears 3.5.1, 3.5.2 and the planetary gear 3.6 has two corresponding partial bearing gears 3.6.1, 3.6.2, being respectively rotatably divided, as shown more closely in FIG. 4.

Figure 4:
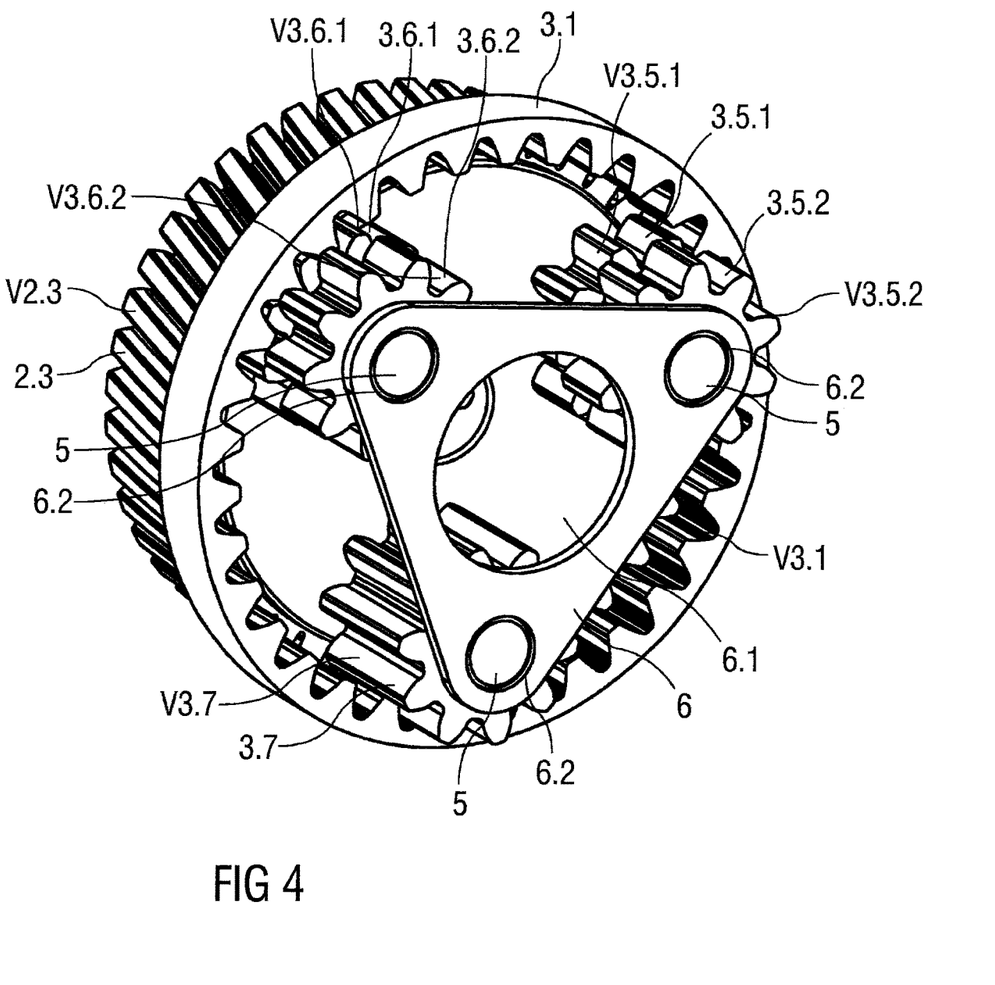

FIG. 4 shows in perspective representation the epicyclic gear 3 with the drive wheel 2.3 and the first ring gear 3.1 and the planetary gears 3.5 to 3.7, but without the second ring gear 3.2 for a better representation of the rolling of the partial bearing gears 3.5.1 to 3.6.2 with their external toothings V3.5.1 to V3.6.2 in the internal toothings V3.1 and V3.2 of the two ring gears 3.1, 3.2.

Figure 2:
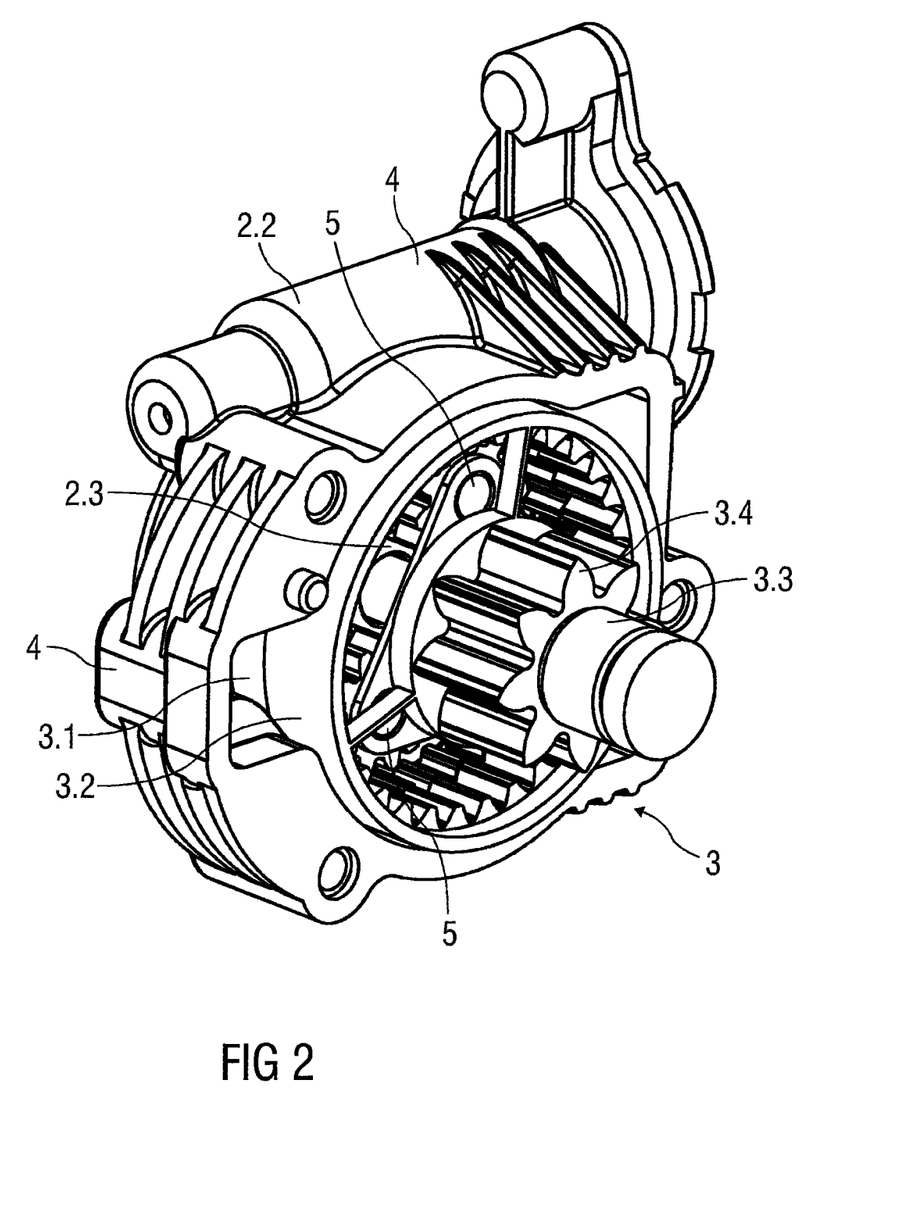
Figure 3:
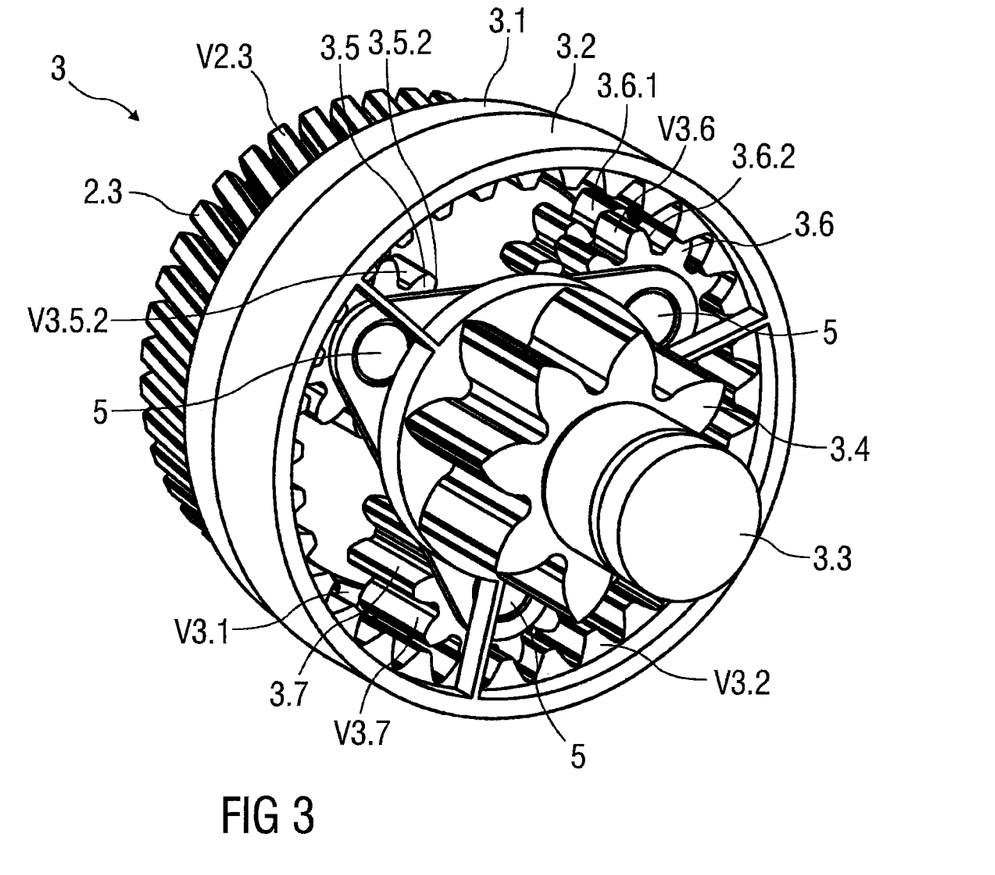

One of the partial bearing gears 3.5.1 or 3.6.1 rolls in the one ring gear 3.1, especially against its internal toothing V3.1, and the other of the partial bearing gears 3.5.2 and 3.6.2 rolls against the other ring gear 3.2, especially against its internal toothing V3.2 (not shown in FIG. 4, but shown in FIGS. 1 to 3).

The third planetary gear 3.7 is designed as a single piece. The third planetary gear 3.7 stands in the force flow and extends across both ring gears 3.1 and 3.2 in the longitudinal extension. With each complete revolution of the third planetary gear 3.7, the rotatable ring gear 3.2 is advanced or turned by one tooth, thanks to the turning of the drive wheel 2.3.

For this, the ring gears 3.1 and 3.2 have an internal toothing V3.1 and V3.2 with a different number of teeth. The internal toothing V3.2 of the rotatable ring gear 3.2 in particular has one more tooth than the internal toothing V3.1 of the stationary ring gear 3.1.

The gearing unit, configured and described as an epicyclic gearing unit 3, is designed as a self-locking planetary gearing unit and it has no sun wheel or eccentric cam, unlike conventional planetary gearings.

For this reason, the planetary gears 3.5 to 3.7 are respectively connected firmly by means of a bolt 5 to the drive wheel 2.3.

FIG. 4 shows schematically in perspective representation the connection of the planetary gears 3.5 to 3.7 to the drive wheel 2.3 by means of the bolt 5 without housing 4. Only the stationary ring gear 3.1 and the drive wheel 2.3 are shown here. The bolts 5 protrude perpendicularly from the end surface of the drive wheel 2.3 in the direction of the planetary gears 3.5 to 3.7. Furthermore, a holding element 6 such as a securing plate or disk can be mounted for the rotationally firm securing of these planetary gears 3.5 to 3.7 on the drive wheel 2.3 at the end of the bolt 5 opposite the drive wheel 2.3. The holding element 6 has a central recess 6.1 for mounting of the output shaft 3.3.

The holding element 6 has three symmetrically arranged mounts 6.2 for the bolts 5. The holding element 6 may also have a shape differing from the triangular shape depicted. The holding element 6 has external dimensions which are smaller than the internal dimensions of the ring gears 3.1 and 3.2.

Figure 5:
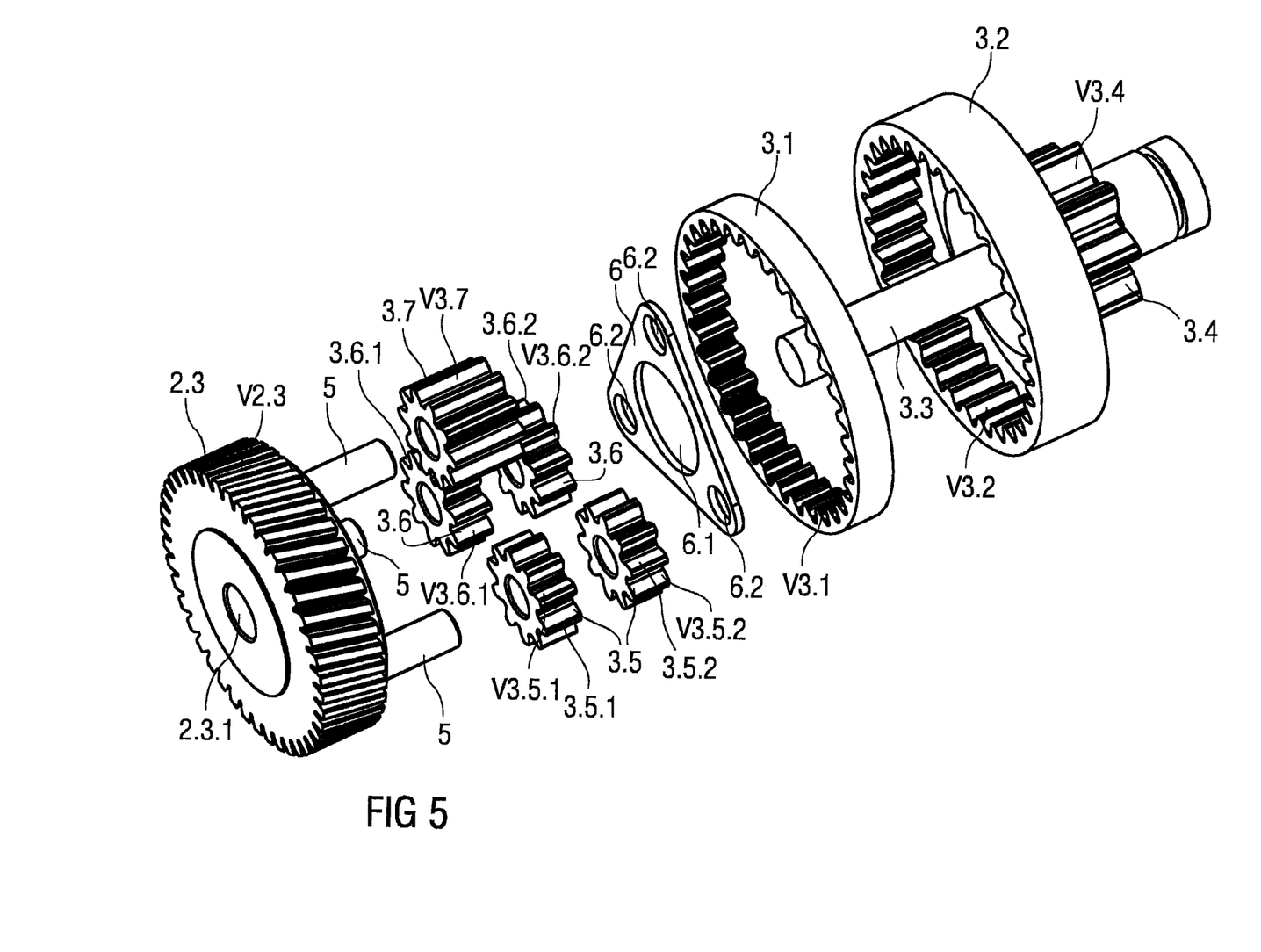

FIG. 5 shows schematically in exploded representation the epicyclic gearing unit 3 with the drive wheel 2.3 as a worm wheel with the bolts 5 protruding from the drive wheel to mount the planetary gears 3.5 to 3.7, the ring gears 3.1, 3.2, the planetary gears 3.5 to 3.7 and the bracket 7 for them and the output shaft 3.3 with pinion 3.4.

The drive wheel 2.3 comprises a bearing 2.3.1 for the output shaft 3.3. The pinion 3.4 has an external toothing V3.4, engaging for example with a spindle of one of the adjusting units V and driven during the operation of the motor M in order to bring about an adjustment.

Figure 6:
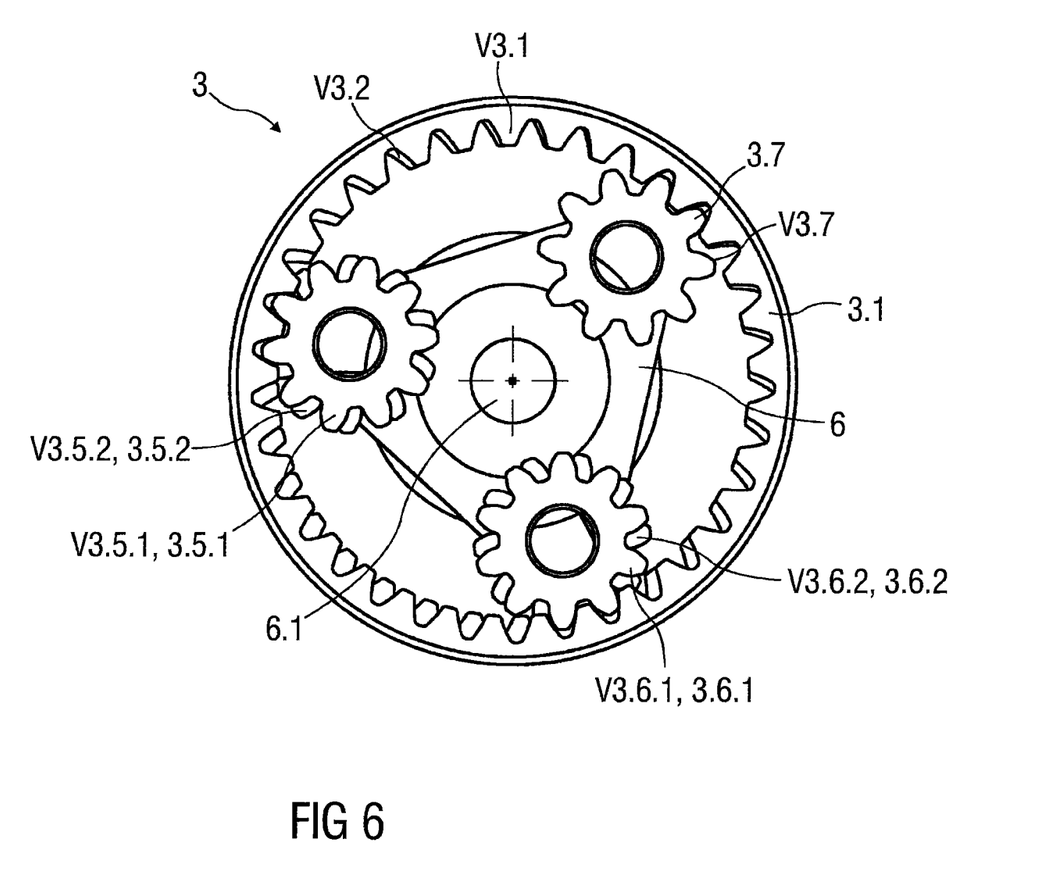

FIG. 6 shows schematically a top view of the drive side (without drive wheel 2.3) of the gearing unit 3 with the rolling of the planetary gears 3.5 to 3.7 against the ring gears 3.1, 3.2. The planetary gears 3.5 to 3.7 have corresponding through openings to accommodate the bolts 5, not shown more closely in this FIG. 6 but shown in FIG. 5, in which the bolts 5 are accommodated. The free ends of the bolts 5 are held in the bracket 7 in the assembled state of the gearing unit 3.

Figure 7:
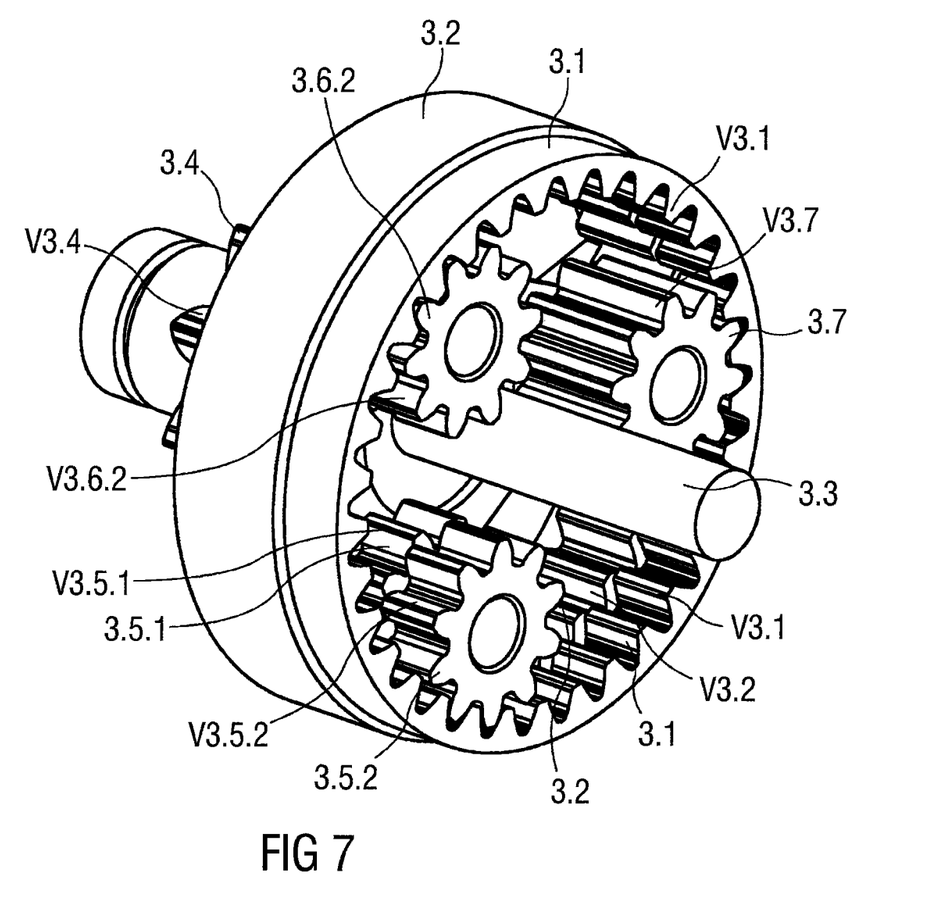

FIG. 7 shows schematically in perspective view the epicyclic gearing unit 3 without drive wheel and the rolling of the planetary gears 3.5 to 3.7 against the ring gears 3.1, 3.2 and with output shaft 3.3 and the pinion 3.4.

The output elements, especially the planetary gears 3.5 to 3.7, roll in the stationary ring gear 3.1 and the driven and rotatable ring gear 3.2 at the output side.

Figure 8:
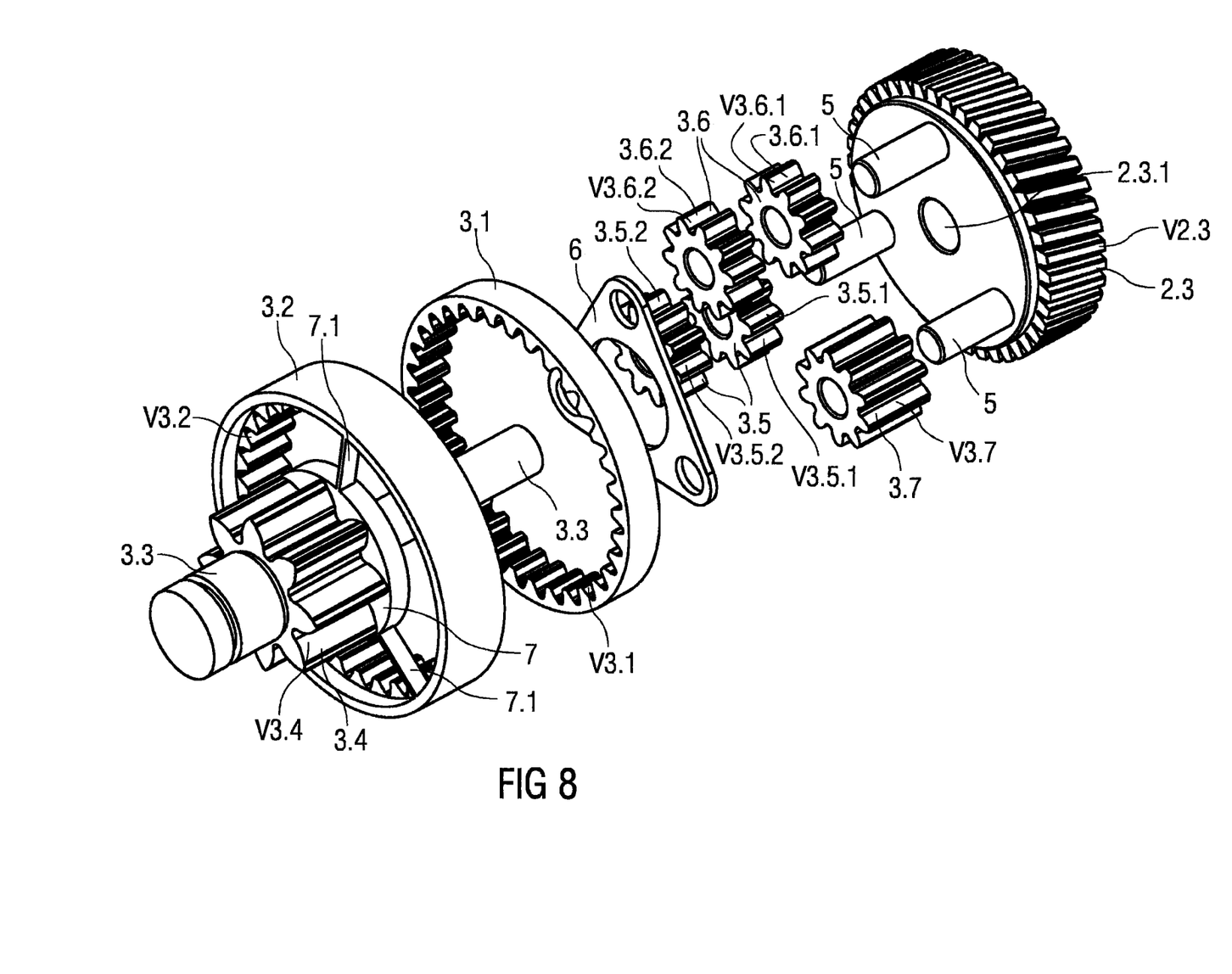

FIG. 8 shows an exploded representation of the epicyclic gearing unit 3.

For the mounting of the output shaft 3.3 with the pinion 3.4, a bracket 7 may be provided at the housing end or at ring gear 3.2 of the output end (as shown). The bracket 7 is formed as a disk or plate and is braced by means of webs 7.1 on the housing 4, especially a cover 3.8, in particular a housing cover, or on the ring gear 3.2, as shown.

Figure 9:
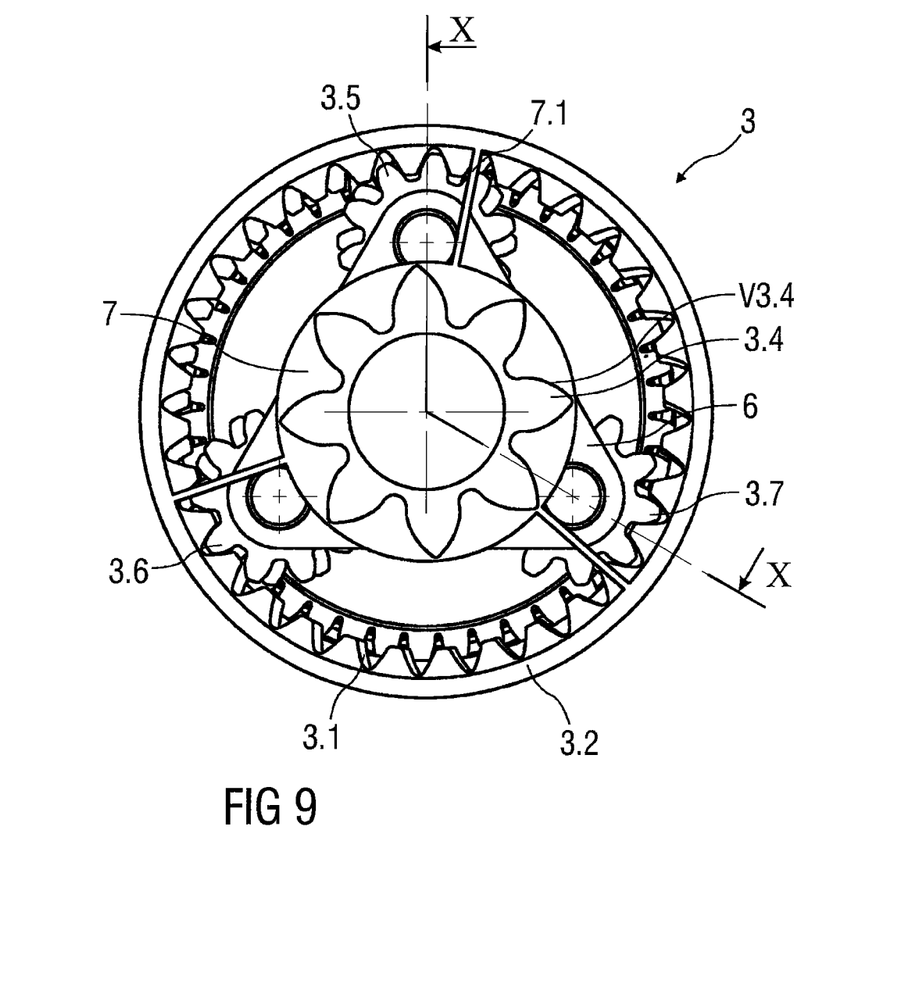

FIG. 9 shows in top view from the output side the gearing unit 3 with the holding element 6 for the planetary gears 3.5 to 3.7 and the bracket 7 for the output shaft 3.3.

Figure 10:
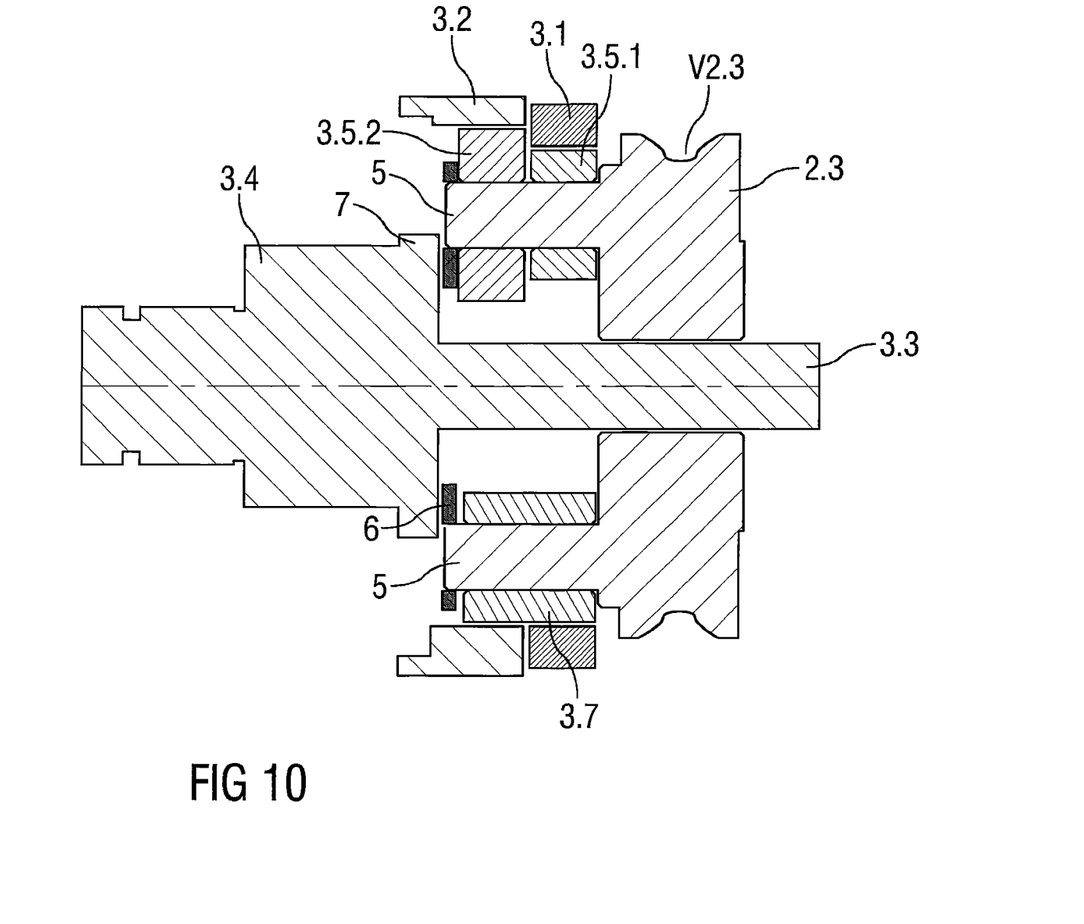

FIG. 10 shows the gearing unit 3 with the holding element 6 for the bolts 5 of the planetary gears 3.5 to 3.7 and with the bracket 7 for the output shaft 3.3 in a cross-sectional representation.

FIG. 11 shows schematically in exploded representation the gear motor M with the gearing assembly 1.

FIG. 12 shows schematically, in perspective view, the assembled gear motor M in the closed housing 4, which may consist of multiple housing pieces.

Figure 13:
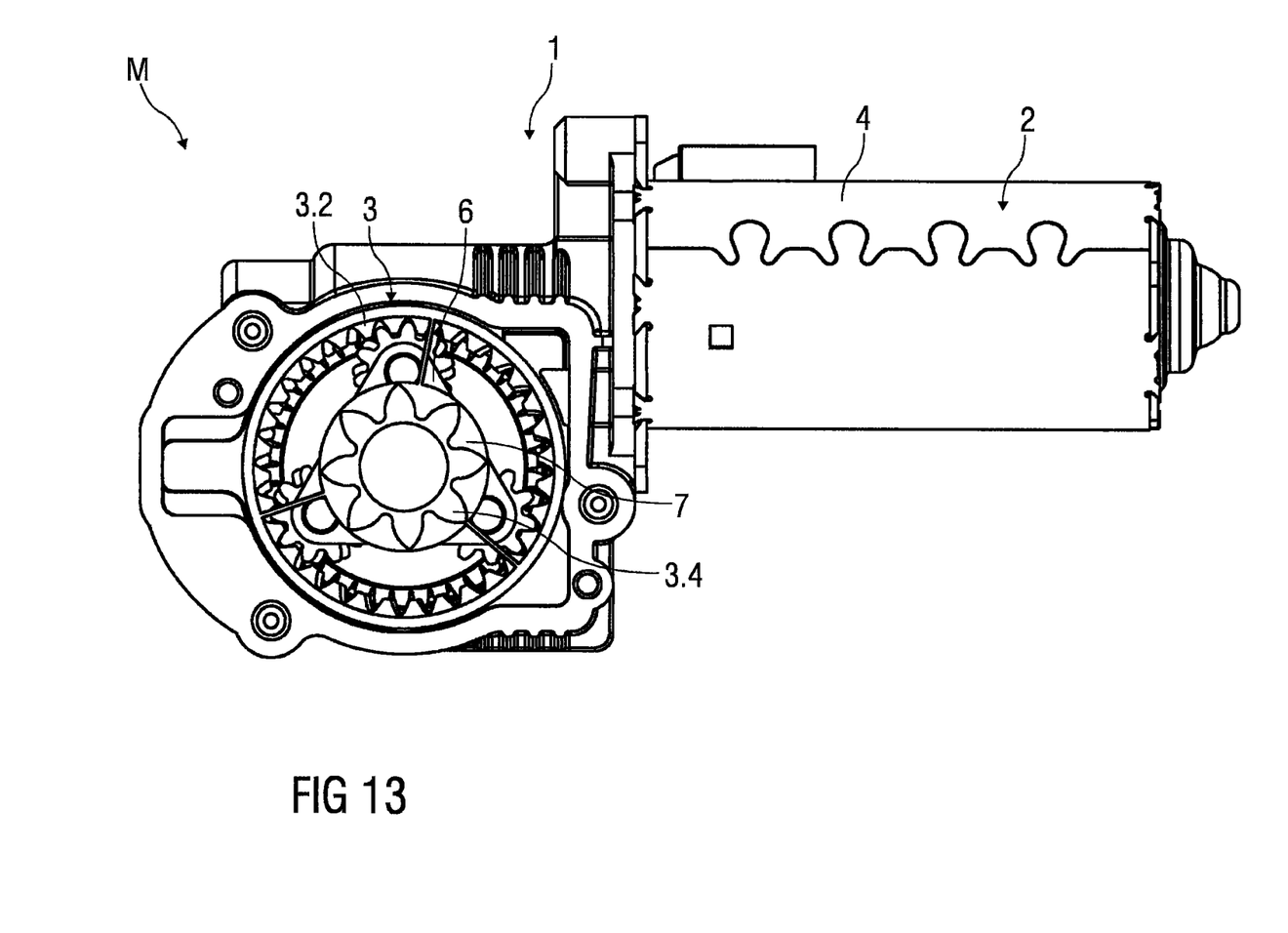

FIG. 13 shows the gear motor M in the assembled state, without cover 3.8.

Owing to the cam-free design of the epicyclic gearing unit 3, the degree of efficiency is increased and the wear is decreased. Furthermore, the gearing assembly 1 makes possible a high transmission ratio owing to the difference in the number of teeth of the ring gears 3.1, 3.2 to one another of one tooth, for example.

LIST OF REFERENCE SYMBOLS

1 Gearing assembly
2 Drive unit
2.1 Motor
2.2 Drive shaft
2.3 Drive wheel
2.3.1 Bearing
3 Gearing unit
3.1 Ring gear
3.2 Ring gear
3.3 Output shaft
3.4 Pinion
3.5 to 3.7 Planetary gears
3.5.1, 3.5.2, 3.6.1, 3.6.2 Partial bearing gears
3.8 Cover
4 Housing
5 Bolt
6 Holding element
6.1 Recess
6.2 Mounts
7 Bracket
7.1 Webs
M Gear motor
V Adjusting unit
V2.3, V3.4, V3.5.1 to V3.6.2, 3.7 External toothing
V3.1, V3.2 Internal toothing
S Seat

The invention claimed is:

1. A gearing assembly for torque transmission, comprising
an epicyclic gearing unit having two ring gears, each having a toothing with a different number of teeth,
wherein at least three planetary gears roll in the two ring gears, wherein one of the ring gears is stationary and the other ring gear is designed to be movable and
wherein two of the planetary gears each have two rotatably divided gears, said two divided gears are partial bearing gears that are separate from one another and which are adapted to rotate independently in the two ring gears, and a third, single piece planetary gear that is adapted to rotate in the two ring gears as a force-transmitting gear.

2. The gearing assembly as claimed in claim 1, wherein the two bearing gears have toothings with the same number of teeth.

3. The gearing assembly as claimed in claim 1, wherein the partial bearing gears of one of the bearing gears have toothings with an equal number of teeth.

4. The gearing assembly as claimed in claim 1, wherein a drive wheel is provided at a drive side on one of the two ring gears, having three bolts at an end face in a direction of the ring gears to receive one each of the planetary gears.

5. The gearing assembly as claimed in claim 4, wherein a holding element is fitted on a free end of the bolts that carry the planetary gears.

6. The gearing assembly as claimed in claim 4, wherein a bracket is arranged at an output side, carrying an output shaft which is coupled to the drive wheel.

7. The gearing assembly as claimed in claim 6, wherein the bracket is held by webs in the ring gear at the output side.

8. The gearing assembly as claimed in claim 6, wherein a pinion is arranged on the bracket at the output side.

9. The gearing assembly as claimed in claim 1, wherein said gearing assembly is part of a gear motor, wherein a drive unit is coupled thereto.

* * * * *